(12) United States Patent
Erickson et al.

(10) Patent No.: US 9,103,284 B2
(45) Date of Patent: Aug. 11, 2015

(54) UTILIZATION OF FUEL GAS FOR PURGING A DORMANT FUEL GAS CIRCUIT

(75) Inventors: Dean Matthew Erickson, Simpsonville, SC (US); Robert Lester Brooks, Greer, SC (US); Douglas Scott Byrd, Greer, SC (US); Joseph Robert Law, Greer, SC (US)

(73) Assignee: General Electric Company, Schenectady, NY (US)

( * ) Notice: Subject to any disclaimer, the term of this patent is extended or adjusted under 35 U.S.C. 154(b) by 682 days.

(21) Appl. No.: 13/484,410

(22) Filed: May 31, 2012

(65) Prior Publication Data

US 2013/0318993 A1 Dec. 5, 2013

(51) Int. Cl.
*F23K 5/18* (2006.01)
*F02C 7/22* (2006.01)
*F02C 7/232* (2006.01)

(52) U.S. Cl.
CPC . *F02C 7/22* (2013.01); *F02C 7/222* (2013.01); *F02C 7/232* (2013.01); *F23K 5/18* (2013.01)

(58) Field of Classification Search
CPC .............. F23R 3/28; F23R 3/346; F02C 7/22; F02C 7/222; F02C 7/232; F02C 3/22; F23K 5/18

USPC ........... 60/733, 734, 739, 740, 742, 746, 747, 60/779, 39.465, 773, 39.094
See application file for complete search history.

(56) References Cited

U.S. PATENT DOCUMENTS

| | | | |
|---|---|---|---|
| 3,875,380 A * | 4/1975 | Rankin | 700/69 |
| 6,145,294 A | 11/2000 | Traver et al. | |
| 6,370,863 B2 * | 4/2002 | Muller et al. | 60/776 |
| 6,397,602 B2 * | 6/2002 | Vandervort et al. | 60/737 |
| 6,405,524 B1 | 6/2002 | Mistry et al. | |
| 6,438,963 B1 | 8/2002 | Traver et al. | |
| 6,813,876 B2 * | 11/2004 | Griffiths et al. | 60/39.281 |
| 7,104,070 B2 | 9/2006 | Iasillo et al. | |
| 7,721,521 B2 | 5/2010 | Kunkle et al. | |
| 7,770,400 B2 * | 8/2010 | Iasillo et al. | 60/776 |
| 2007/0089395 A1 * | 4/2007 | Fujii et al. | 60/39.281 |

* cited by examiner

*Primary Examiner* — Steven Sutherland

(74) *Attorney, Agent, or Firm* — Ernest G. Cusick; Hoffman Warnick LLC

(57) ABSTRACT

An approach for utilizing fuel gas to purge a dormant fuel gas circuit is disclosed. In one aspect, there is a fuel gas supply that supplies fuel to fuel gas circuits. Gas control valves, each coupled to one of the fuel gas circuits control the flow of fuel gas thereto from the fuel gas supply. A fuel purge system selectively purges fuel gas circuits from the fuel gas circuits that are dormant with fuel gas from the fuel gas supply.

17 Claims, 5 Drawing Sheets

UTILIZATION OF FUEL GAS FOR PURGING A DORMANT FUEL GAS CIRCUIT

BACKGROUND OF THE INVENTION

The present invention relates generally to combustion turbine engines, and more particularly, to using fuel gas to purge dormant fuel gas circuits within a combustion turbine engine as the engine transitions through different combustion modes.

A combustion turbine engine, such as a gas turbine engine that releases low-level emissions of oxides of nitrogen (NOx), operates generally by staging the delivery of fuel gas to different fuel gas circuits (e.g., the fuel lines, fuel passage manifolds and fuel nozzles, etc.) within the combustor section of the engine as load is ramped up. Each fuel gas circuit utilizes a gas control valve to control the delivery of the fuel gas that is necessary for the circuit to receive during the various combustion modes that can occur during steady-state and transient-state operations. During certain combustion modes, some of the fuel gas circuits will have no fuel delivered. When the fuel gas circuits have no fuel delivered they become dormant during that particular combustion mode. While the fuel gas circuits are dormant, it is necessary to purge these stagnant passages in order to prevent condensate from accumulating, and to minimize the potential for combustion gases from back-flowing, which can result in damage to the fuel nozzles. Typically, the dormant fuel gas circuits are purged with high temperature, high pressure, purge air extracted from the compressor section of the gas turbine engine. After being purged with the air extracted from the compressor section, the fuel gas circuits wait in the dormant state until the combustion mode transitions to another mode that causes them to become active and have fuel gas delivered. When purging a dormant fuel gas circuit with purge air, there is a potential for creating a combustible mixture when fuel gas leaks across a closed gas control valve that is in flow communication with the circuit, and mixes with the purge air.

BRIEF DESCRIPTION OF THE INVENTION

In one aspect of the present invention, a system is provided. The system comprises a fuel gas supply and a plurality of fuel gas circuits. A plurality of gas control valves, each coupled to one of the plurality of fuel gas circuits, control flow of fuel gas thereto from the fuel gas supply. A fuel purge system selectively purges fuel gas circuits from the plurality of fuel gas circuits that are dormant with fuel gas from the fuel gas supply.

In a second aspect of the present invention, a fuel purge system for a combustion turbine engine is disclosed. The system comprises a fuel gas supply and a plurality of fuel gas circuits. A plurality of gas control valves, each coupled to one of the plurality of fuel gas circuits, control flow of fuel gas thereto from the fuel gas supply. A purge system selectively purges at least one fuel gas circuit from the plurality of fuel gas circuits that is dormant with a predetermined amount of fuel gas from the fuel gas supply to maintain a positive pressure therein.

In a third aspect of the present invention, a method for purging a gas turbine engine having a compressor, a combustor that receives compressed air from the compressor and fuel gas from a fuel gas supply for combustion in a plurality of fuel gas circuits that generate hot gases to drive a turbine is disclosed. The method comprises: selectively defueling fuel gas circuits from the plurality of fuel gas circuits as the combustor transitions through combustion mode changes, wherein fuel gas circuits change from being active to being dormant in response to being defueled; and selectively purging fuel gas circuits from the plurality of fuel gas circuits that are dormant with a predetermined amount of fuel gas from the fuel gas supply to maintain a positive pressure through the fuel gas circuits.

DETAILED DESCRIPTION OF THE INVENTION

Various embodiments of the present invention are directed to utilizing fuel gas to selectively purge fuel gas circuits operating within a combustor section of a combustion turbine engine such as a gas turbine engine. In one embodiment, a purge system selectively purges dormant fuel gas circuits with a predetermined amount of fuel gas to maintain a positive pressure, thereby preventing a backflow of fluid while in the dormant state. In one embodiment, the purge system includes a by-pass valve coupled to at least one of the gas control valves that are associated with each of the fuel gas circuits that control the flow of fuel gas to each circuit. In one embodiment, the by-pass valve is in an open position while the at least one gas control valve is in a closed position, enabling the predetermined amount of fuel gas to flow into a dormant fuel gas circuit. In another embodiment, the purge system is configured to selectively purge dormant fuel gas circuits with purge air extracted from the compressor section of the gas turbine engine. In one embodiment, the purge system includes an isolation valve coupled in series, downstream to at least one of the gas control valves that are associated with each of the fuel gas circuits that control the flow of fuel gas to each circuit, and a vent valve coupled between the isolation valve and the at least one gas control valve. The isolation valve and the vent valve prevent fuel gas from mixing with the purge air supplied into the dormant fuel gas circuit provided from the compressor section of the gas turbine engine. In one embodiment, the isolation valve, the at least one gas control valve, and the vent valve collectively form a double-block and bleed valve configuration.

Technical effects of the various embodiments of the present invention include eliminating the potential of creating a combustible mixture that can arise in certain fuel gas circuits when purge air provided from the compressor section of the gas turbine engine mixes with leaking fuel gas.

Figure 1:
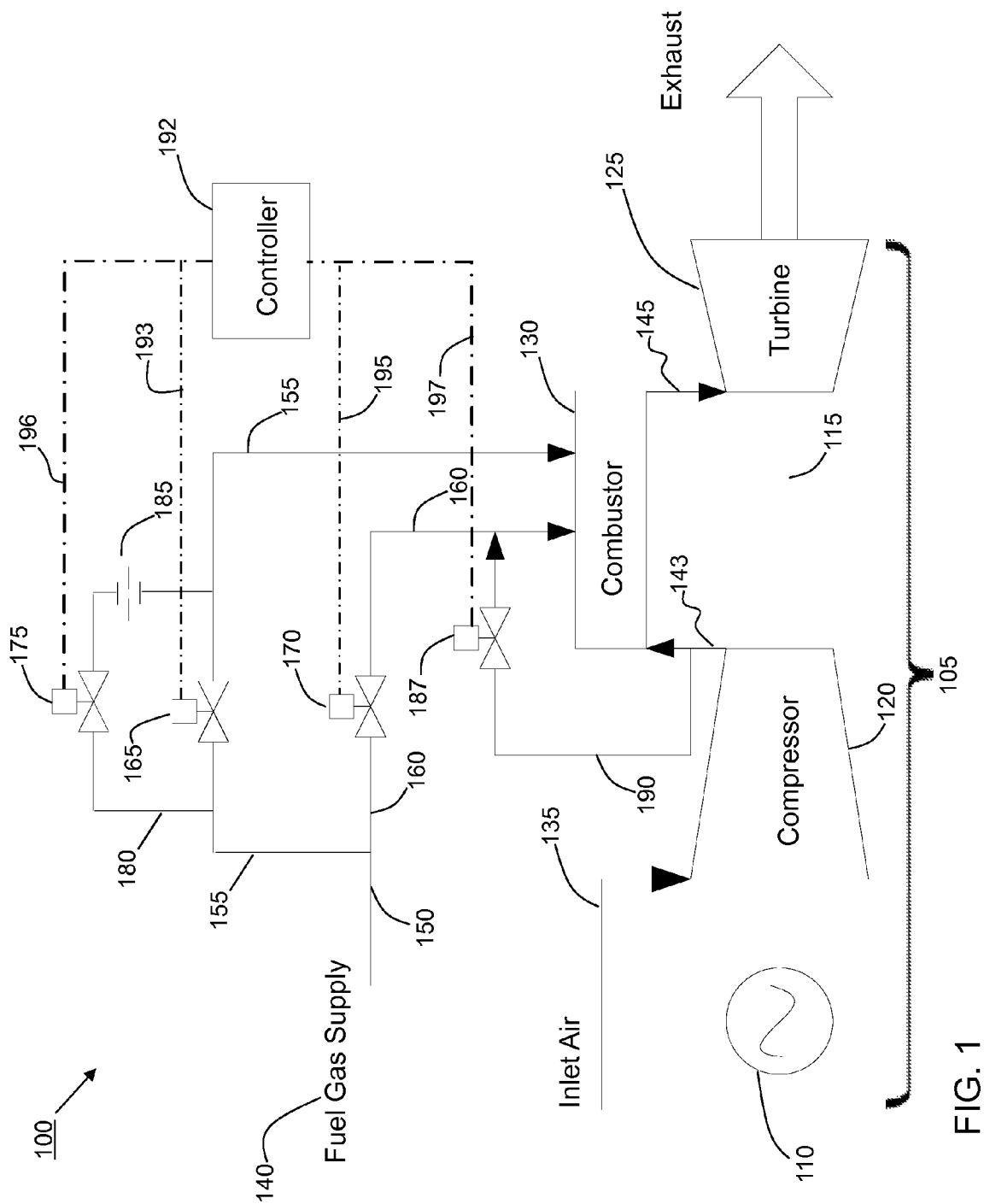
FIG. 1 is a high-level schematic illustration of a fuel purge system for a combustion turbine engine such as a gas turbine engine, according to one embodiment of the present invention.

Referring to the drawings, FIG. 1 shows a high-level schematic illustration of a fuel purge system 100 for a combustion turbine engine 105 according to one embodiment of the present invention. As used herein, a combustion turbine engine can include all types of combustion turbine or rotary engines, including engines of power generating plants (e.g., a gas turbine engine) and others, as well as aircraft engines. Combustion turbine engine 105 includes an electric generator 110 that is connected by a rotor shaft 115 to a compressor 120 and a turbine 125. The connections and configuration of these components may be made pursuant to conventional technology. A combustor 130 may be positioned between compressor 120 and turbine 125. As shown in FIG. 1, an air intake line 135 may be connected to compressor 120. Air intake line 135 provides inlet air to compressor 120. A first conduit 143 may connect compressor 120 to combustor 130 and may direct the air that is compressed by compressor 120 into combustor 130. Combustor 130 generally combusts the supply of compressed air with a fuel provided from fuel gas supply 140 in a known manner to produce a hot compressed motive gas, also known as a working fluid.

A second conduit 145 conducts the working fluid away from combustor 130 and directs it to turbine 125, where it is used to drive turbine 125. In particular, the working fluid expands in turbine 125, causing rotor blades of turbine 125 to rotate about rotor shaft 115. The rotation of the blades causes rotor shaft 115 to rotate. In this manner, the mechanical energy associated with the rotating rotor shaft 115 may be used to drive rotor blades of compressor 120 to rotate about rotor shaft 115. The rotation of the rotor blades of compressor 120 causes it to supply the compressed air to combustor 130 for combustion. This in turn causes coils of generator 110 to generate electric power and produce electricity.

Those skilled in the art will recognize that combustion turbine engine 105 as shown in FIG. 1 and described above, is only one example of a turbine engine that can be implemented with the fuel purge system of the present invention according to various embodiments described herein. Combustion turbine engine 105 is not meant to limit the scope of the various embodiments of the fuel purge system described herein. Other combustion turbine engine applications are suitable for use with the various embodiments of the fuel purge system described herein.

Fuel purge system 100 may be implemented with the fuel gas delivery system of combustion turbine engine 105. In FIG. 1, the fuel gas delivery system can receive fuel gas from fuel gas supply 140 via a fuel gas supply line 150. As shown in FIG. 1, fuel gas from fuel gas supply line 150 can be delivered to fuel line 155 and fuel line 160, which feed fuel gas into combustor 130 for combustion with compressed air provided by compressor 120. Those skilled in the art will recognize that this number of fuel lines is only an example and is not meant to limit the various embodiments of the present invention. A gas control valve 165 can control the flow of fuel gas provided from fuel gas supply 140 through fuel line 155 to combustor 130, while a gas control valve 170 can control the flow of fuel gas provided from fuel gas supply 140 through fuel line 160 to combustor 130.

Although not shown in FIG. 1 those skilled in the art will recognize that fuel line 155 and fuel line 160 can have other components that facilitate the supply of fuel gas to combustor 130. For example, portions of fuel line 155 and fuel line 160 that are upstream (i.e., to the left) of gas control valve 165 and gas control valve 170, respectively, may include components such as, for example, fuel compressors, fuel after-coolers, straining elements, instrumentation that monitors pressure and temperature, stop valves, stop/speed ratio valves, vent valves, and the like. Similarly, portions of fuel line 155 and fuel line 160 that are downstream (i.e., to the right) of gas control valve 165 and gas control valve 170, respectively, may include components, such as, for example, fuel passage manifolds and accompanying fuel nozzles, straining elements, pressure gages, conduits, and the like. As used herein, these components of fuel line 155 and fuel line 160 that are downstream of gas control valve 165 and gas control valve 170, form fuel gas circuits which are used to deliver fuel gas to combustor 130.

For applications in which it desirable to generate low-level emissions of oxides of nitrogen (NOx) in the exhaust released from turbine 125, the delivery of fuel gas to combustor 130 from the different fuel gas circuits is staged as the load of combustion turbine engine 105 is ramped up. As a result, during certain combustion modes, some of the fuel gas circuits will have no fuel scheduled. When the fuel gas circuits have no fuel scheduled they are defueled becoming dormant during that particular combustion mode. While the fuel gas circuits are dormant, it is necessary to purge these stagnant passages in order to prevent condensate from accumulating, and to minimize the potential for auto-ignition.

In the various embodiments of the present invention, fuel gas from fuel gas supply 140 can be used to purge gas from dormant fuel gas circuits. In one embodiment, fuel purge system 100 of FIG. 1 can include a gas purge valve 175 to purge fuel line 155 with fuel gas from fuel gas supply 140. In this example, a fuel gas purge line 180 branching off fuel line 155, supplies a predetermined amount of fuel gas, via gas purge valve 175 and a fuel gas orifice 185, while fuel line 155 is dormant (i.e., gas control valve 165 is off). This will maintain a positive pressure in fuel line 155. Those skilled in the art will recognize that fuel gas orifice 185 is optional and that the effect provided by orifice 185 can be obtained by sizing gas purge valve 175 to obtain the desired flow restriction to facilitate the gas purge with the desired amount of fuel gas necessary to purge the line.

Those skilled in the art will recognize that not all fuel lines have to be purged with fuel gas. For illustrative purposes, FIG. 1 shows that an air purge valve 187 can be used to facilitate the purge of fuel line 160 while dormant. In one embodiment, high temperature, high pressure, purge air discharged from compressor 120 is provided to an air purge line 190 from first conduit 143. In this manner, air purge valve 187 can be opened while fuel line 160 is dormant (i.e., gas control valve 170 is off), to provide the purge air to the fuel line 160 in order to maintain a positive pressure in the line.

A controller 192, as shown in FIG. 1, can control the fuel gas delivery of fuel gas from fuel gas supply 140 to combustor 130, as well as the purging of fuel lines 155 and 160 with fuel gas and purge air, respectively. For example, the settings of gas control valve 165 and gas control valve 170 that regulate the flow of fuel gas through fuel line 155 and fuel line 160, respectively, may be controlled pursuant to control signals generated from controller 192 along respective control lines 193 and 195 indicated in FIG. 1 as dashed lines. Likewise, the settings of gas purge valve 175 and air purge valve 187 that purge fuel gas through fuel line 155 and purge air through fuel line 160, respectively, may be controlled pursuant to control signals generated from controller 192 along respective control lines 196 and 197 indicated in FIG. 1 as dashed lines.

Controller 192 may comprise an electronic or computer implemented device that includes control logic pertaining to the operation of the one or more valves. Pursuant to this control logic and/or one or more operating parameters monitored by controller 192, the controller can send electronic signals to the one or more valves and, thereby, control the settings of the valves. In this manner, the one or more valves may be controlled, for example, to perform functions such as controlling the flow of fuel gas through fuel lines 155 and 160, and controlling the purge of these lines, while dormant with fuel gas and purge air.

In one embodiment, the processing operations performed by controller 192 may be implemented in the form of an entirely hardware embodiment or an embodiment containing both hardware and software elements. For example, a single special-purpose integrated circuit, such as an application specific integrated circuit (ASIC), having a main or central processor section for overall, system-level control, and separate sections dedicated to performing various different specific combinations, functions and other processes under control of the central processor section, can be used. Controller 192 may also be implemented using a suitably programmed general-purpose computer, such as a microprocessor or microcontroller, or other process device such as a central processing unit (CPU) or microprocessor unit (MPU), either alone or in conjunction with one or more peripheral data and signal processing devices. In general, any device or similar devices on which a finite state machine capable of implementing logic flow that represents the various process functions performed by controller 192 can be used. Controller 192 may also be implemented using a variety of separate dedicated or programmable integrated or other electronic circuits or devices, such as hardwired electronic or logic circuits, including discrete element circuits or programmable logic devices such as programmable logic devices (PLDs), programmable array logic devices (PALs), programmable logic arrays (PLAs), or the like.

In one embodiment, the processing functions performed by controller 192 may be implemented in software, which includes but is not limited to firmware, resident software, microcode, etc. Furthermore, the processing functions performed by controller 192 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Referring back to the figures, those skilled in the art will appreciate that combustion turbine engine 105 and fuel purge system 100 may have other components in addition to those shown in FIG. 1. For example, those other components may include filters, fuel gas scrubbers, heaters, sensors, etc. The inclusion and configuration of these elements are not essential to the operation of the various embodiments of the present invention described herein. Thus, these other components are neither shown in FIG. 1 nor discussed in detail in this disclosure. Similarly, the fuel purge system shown in FIGS. 2-5 may include other components in addition to those shown. However, due to their tangential nature with regard to the various embodiments of the present invention, these components are neither illustrated nor described herein.

FIGS. 2-5 show a fuel purge system 200 operating in various combustion modes that can be implemented with a combustion turbine engine such as the one illustrated in FIG. 1, or in a different combustion turbine engine application. All of the components of fuel purge system 200 that are illustrated in FIGS. 2-5 are substantially the same. Accordingly, for the sake of clarity and brevity, similar numerical identifiers are used in FIGS. 2-5 for common components. Because each of the illustrations shown in FIGS. 2-5 represent a different mode of operation for the combustion turbine engine, the components such as the various valves may operate in a different manner from one figure to the next. In order to illustrate these operational differences between combustion modes, shading of the valves is used to represent different operational positions. As used herein, valves that are shaded are an indication that the valves are in a closed position, while valves that are not shaded are an indication that the valves are in an open position.

Referring to FIGS. 2-5, fuel purge system 200 is shown in use with four fuel gas circuits 202, 204, 206 and 208, in which each can deliver fuel gas from a fuel gas supply 210 to a combustor (not shown). Those skilled in the art will recognize that this number of fuel gas circuits is only for illustration purposes and is not meant to limit the scope of the various embodiments of the fuel purge system described herein. Fuel gas circuit 202 may include a fuel passage manifold (D5) 212 with accompanying fuel nozzles 214 that direct the flow of any fuel gas supplied along fuel line 216 to the combustor. In one embodiment, fuel nozzles 214 of D5 manifold 212 may have five nozzles to direct the flow of fuel gas supplied along fuel line 216 to the combustor.

Fuel gas circuit 204 may include a fuel passage manifold (PM1) 218 with accompanying fuel nozzles 220 that direct the flow of any fuel gas supplied along fuel line 222 to the combustor. In one embodiment, fuel nozzles 220 of PM1 manifold 218 may have one nozzle to direct the flow of fuel gas supplied along fuel line 222 to the combustor.

Fuel gas circuit 206 may include a fuel passage manifold (PM3) 224 with accompanying fuel nozzles 226 that direct the flow of any fuel gas supplied along fuel line 228 to the combustor. In one embodiment, fuel nozzles 226 of PM3 manifold 224 may have three nozzles to direct the flow of fuel gas supplied along fuel line 228 to the combustor.

Fuel gas circuit 208 may include a fuel passage manifold (PM2) 230 with accompanying fuel nozzles 232 that direct the flow of any fuel gas supplied along fuel line 234 to the combustor. In one embodiment, fuel nozzles 232 of PM2 manifold 230 may have two nozzles to direct the flow of fuel gas supplied along fuel line 234 to the combustor.

In one embodiment, fuel nozzles 214, 220, 226 and 232 associated with D5 manifold 212, PM1 manifold 218, PM3 manifold 224 and PM2 manifold 230, respectively, can each be coupled to a combustion can. In one embodiment, each of the combustion cans may be arranged in an annular array to form the combustor. Combustion in such an arrangement is generally initiated within the combustion cans at a point slightly downstream of each the nozzles emanating from the manifolds, where air from the compressor is mixed with fuel from the nozzles for combustion thereof.

Gas control valves 236, 238, 240 and 242 can be used to control the flow of fuel gas provided from fuel gas supply 210 to fuel gas circuits 202, 204, 206 and 208, respectively. In particular, gas control valve 236 is the D5 gas control valve for D5 manifold 212, gas control valve 238 is the PM1 gas control valve for PM1 manifold 218, and gas control valve 240 is the PM3 gas control valve for PM3 manifold 224, while gas control valve 242 is the PM2 gas control valve for PM2 manifold 230.

In one embodiment, a fuel gas supply line 244 can be used to deliver fuel gas from fuel gas supply 210 to fuel gas circuits 202, 204, 206 and 208 via gas control valves 236, 238, 240 and 242, respectively. A straining element 246 (e.g., a Y-strainer) can be located along fuel gas supply line 244 to remove unwanted solids that are present in the fuel gas. A stop valve 248 can be positioned along fuel gas supply line 244, downstream of straining element 246, to be used in scenarios (e.g., fail-safe tripping operations), where it is desirable to stop the flow of fuel gas from fuel gas supply 210 to fuel gas circuits 202, 204, 206 and 208.

In one embodiment, stop valve 248 can act as a backup stop valve for a stop/speed ratio valve 250 located downstream of stop valve 248. Generally, stop/speed ratio valve 250 can operate as the primary stop valve making it an integral part of protecting the combustion turbine engine. Stop/speed ratio valve 250 can also be used to regulate the pressure in fuel gas supply line 244 upstream of gas control valves 236, 238, 240 and 242. A vent valve 252 can be located downstream of stop/speed ratio valve 250 in order to further complement the protective features of stop valve 248 and stop/speed ratio valve 250 during a fail-safe operation scenario. For example, vent valve 252 can be opened upon the closure of stop valve 248 and stop/speed ratio valve 250 to bleed any fuel gas that remains in fuel gas supply line 244. This prevents the fuel gas from flowing further through a distribution header 254, and onto fuel gas circuits 202, 204, 206 and 208 via their respective gas control valves 236, 238, 240 and 242.

In FIGS. 2-5, fuel purge system 200 can be used to selectively purge fuel gas circuits 202, 204, 206 and 208 with fuel gas while the fuel gas circuits are defueled into a dormant state. For example, a by-pass valve 256 and a fuel gas orifice 258 can be coupled about gas control valve 240. In this manner, when fuel gas circuit 206 is dormant (i.e., gas control valve 240 is closed), a predetermined amount of fuel gas can be supplied from distribution header 254 to fuel gas orifice 258 and by-pass valve 256. Permitting the predetermined amount of fuel gas to flow through fuel gas orifice 258 and by-pass valve 256 to fuel gas circuit 206 while it is dormant, maintains a positive pressure in the fuel gas circuit. Maintaining a positive pressure in fuel gas circuit 206 while dormant prevents a backflow of fluid. A positive pressure can also prevent overheating at fuel nozzles 226 of the PM3 manifold 224.

A by-pass valve 260 and a fuel gas orifice 262 can also be coupled about gas control valve 242. In this manner, when fuel gas circuit 208 is dormant (i.e., gas control valve 242 is in a closed position), a predetermined amount of fuel gas can be supplied from distribution header 254 to fuel gas orifice 262 and by-pass valve 260. Permitting the predetermined amount of fuel gas to flow through fuel gas orifice 262 and by-pass valve 260 to fuel gas circuit 208 while it is dormant, maintains a positive pressure in the fuel gas circuit. Maintaining a positive pressure in fuel gas circuit 208 while dormant prevents a backflow of the fluid. A positive pressure can also prevent overheating at fuel nozzles 232 of the PM2 manifold 230.

Those skilled in the art will recognize that fuel gas orifices 258 and 262 can be used as an option. The effect provided by fuel gas orifices 258 and 262 with fuel purge system 200 can be obtained by sizing by-pass valves 256 and 260 in an appropriate manner to obtain the desired flow restriction with the desired amount of fuel gas to purge fuel gas circuits 206 and 208.

In FIGS. 2-5, some fuel gas circuits may not be able to be purged with fuel gas, and thus these circuits can be purged with purge air obtained from the compressor (not shown in these figures). For example, in the embodiments illustrated in FIGS. 2-5, it is not desirable to purge fuel gas circuit 202, which includes the D5 gas manifold 212, fuel nozzles 214 and fuel line 216, with fuel gas at high load operations because it can increase emissions released from the turbine (not shown in these figures). As a result, it is beneficial to purge fuel gas circuit 202 with purge air obtained from the compressor. In one embodiment, as shown in FIGS. 2-5, purge air can be supplied to fuel gas circuit 202 via a double-block and bleed configuration formed from isolation valves 264 and 266, which can be stop valves. For example, isolation valves 264 and 266 can be positioned along an air purge line 268 that supplies purge air from the compressor to fuel gas circuit 202. A vent valve 270 can be positioned between isolation valves 264 and 266, and be used to bleed any purge air from air purge line 268 that remains in the line when the isolation valves 264 and 266 have been closed. This prevents the purge air from flowing into fuel gas circuit 202, and thus having an auto-ignition scenario arising from the mixing of fuel gas with purge air.

In order to prevent an auto-ignition from arising in fuel gas circuit 202, fuel purge system 200 can include an isolation valve 272, which can be a stop valve, coupled in series, downstream of control valve 236. In addition, a vent valve 274 can be coupled between isolation valve 272 and gas control valve 236. In this manner, isolation valve 272 and vent valve 274 can prevent fuel gas from mixing with the purge air. For example, when fuel gas circuit 202 is dormant, gas control valve 236 is in a closed position, isolation valve 272 can then be closed to ensure that fuel gas does not mix with the purge air while air purge line 268 supplies the purge air to the dormant fuel gas circuit 202. While gas control valve 236 and isolation valve 272 are closed, vent valve 274 can be opened to bleed off any remaining fuel gas that lies in the line between gas control valve 236 and isolation valve 272. In this embodiment, gas control valve 236, isolation valve 272, and vent valve 274 collectively form a double-block and bleed valve configuration that can prevent a combustible condition from arising.

In FIGS. 2-5, it may not be desirable to purge every fuel gas circuit. For example, in the embodiments illustrated in FIGS. 2-5, it is not desirable to purge fuel gas circuit 204, which includes the PM1 gas manifold 218, fuel nozzles 220 and fuel line 222, because this fuel gas circuit will generally always have fuel gas flowing through it no matter what combustion mode of operation is in effect. As a result, there will always be a positive pressure in fuel gas circuit 204, which obviates the need to purge fuel gas.

As mentioned above, FIGS. 2-5 represent different combustion modes of operation for one example of a combustion turbine engine. In this example, the combustion turbine engine is of the type that generates low-levels of NOx emissions. Consequently, the delivery of fuel gas to the combustor from the different fuel gas circuits (e.g., 202, 204, 206 and 208) is staged as the load of the combustion turbine engine is ramped up. Generally, a combustion turbine engine of the type that generates low-levels of NOx is configured to have several different combustion modes of operation that can be implemented during transient-state (e.g., pre-start, start-up, and shut-down) and steady-state (e.g., loading) operations of the engine. FIGS. 2-5 illustrate how fuel purge system 200 performs during a few combustion modes of operations. Those skilled in the art will appreciate that these combustion modes of operation are indicative of only a few example of combustion modes, and the operation of fuel purge system 200 during these other modes will depend on the particular stage of the engine and the desired levels of NOx emissions.

Figure 2:
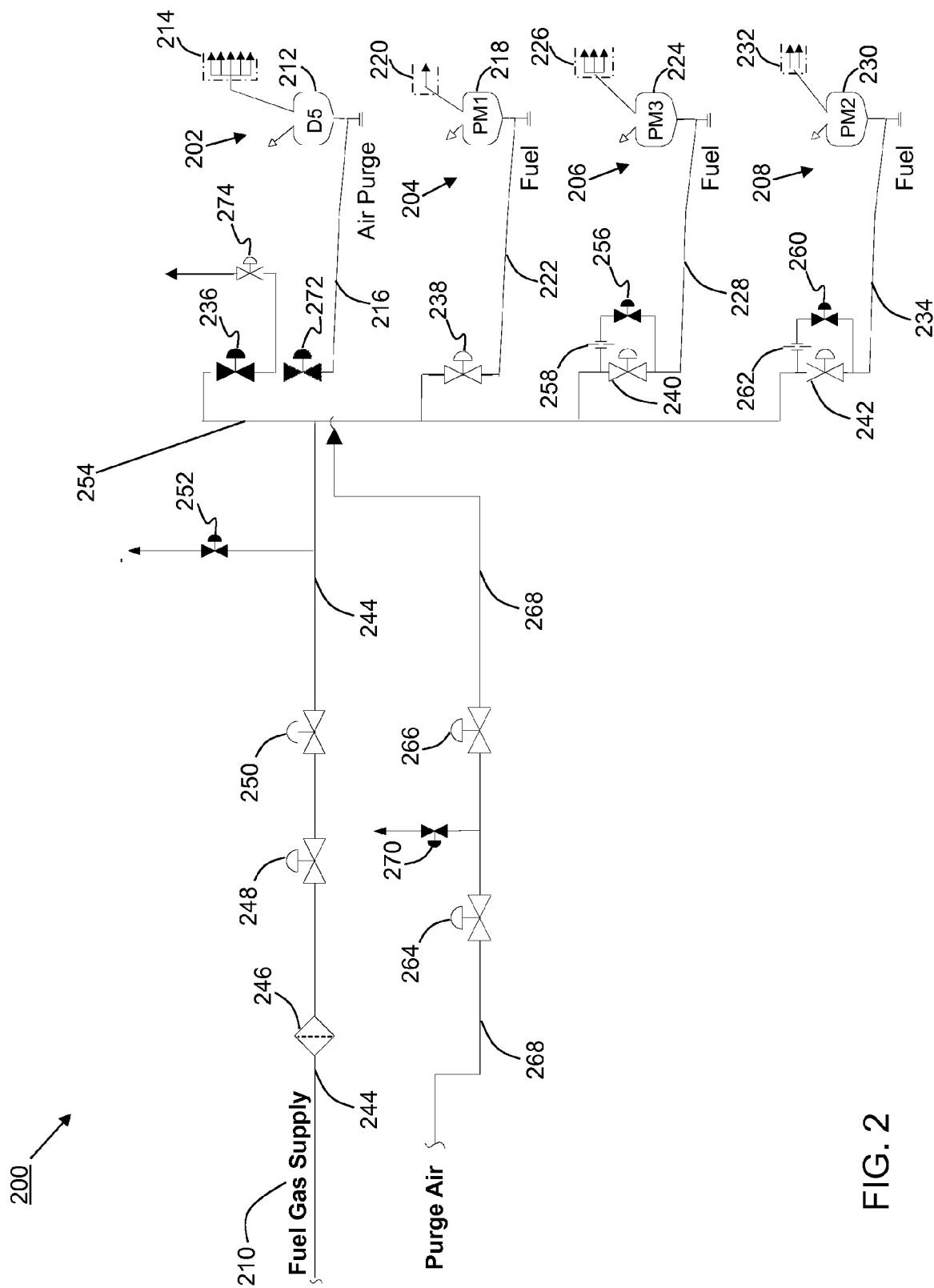
FIG. 2 is a more detailed view of a fuel purge system operating in a first combustion mode that can be implemented in the illustration depicted in FIG. 1 according to one embodiment of the present invention.

Referring now to FIG. 2, fuel purge system 200 is shown operating during a full premix operation. In this example, fuel gas circuits 204, 206 and 208 are fueled, while fuel gas circuit 202 is defueled into a dormant state. As a result, fuel nozzles 220, 226 and 232 all can receive fuel gas from fuel gas supply 210. Fuel nozzles 220, 226 and 232 can receive fuel gas because each of their respective gas control valves (i.e., 238, 240 and 242) are open (non-shaded valves indicate valves are in an open position), thereby permitting the flow of fuel gas from distribution header 254 to PM1 manifold 218, PM3 manifold 224, and PM2 manifold 230 and their respective nozzles. While fuel gas circuits 204, 206 and 208 are being fueled, fuel gas circuit 202 can be purged because it is dormant. To purge fuel gas circuit 202, gas control valve 236 and isolation valve 272 are closed (shaded valves indicate valves are in a closed position), while vent valve 274 is open.

Closing gas control valve 236 and isolation valve 272 stops the flow of fuel gas from distribution header 254 to D5 manifold 212 and accompanying fuel nozzles 214. Opening vent valve 274 can permit the bleeding of any fuel gas that remains between gas control valve 236 and isolation valve 272. Keeping gas control valve 236 and isolation valve 272 closed and vent valve 274 open, prevents mixing of any fuel in fuel line 216 while purge air is supplied from the compressor. In this example, purge air from the compressor is supplied along air purge line 268 when isolation valves 264 and 266 are open (non-shaded valves indicate valves are in an open position) and vent valve 270 is closed (shaded valve indicate a valve in a closed position). Preventing mixing of any fuel in fuel line 216 while purge air is being supplied is beneficial in that potential auto-ignition events are prevented.

Figure 3:
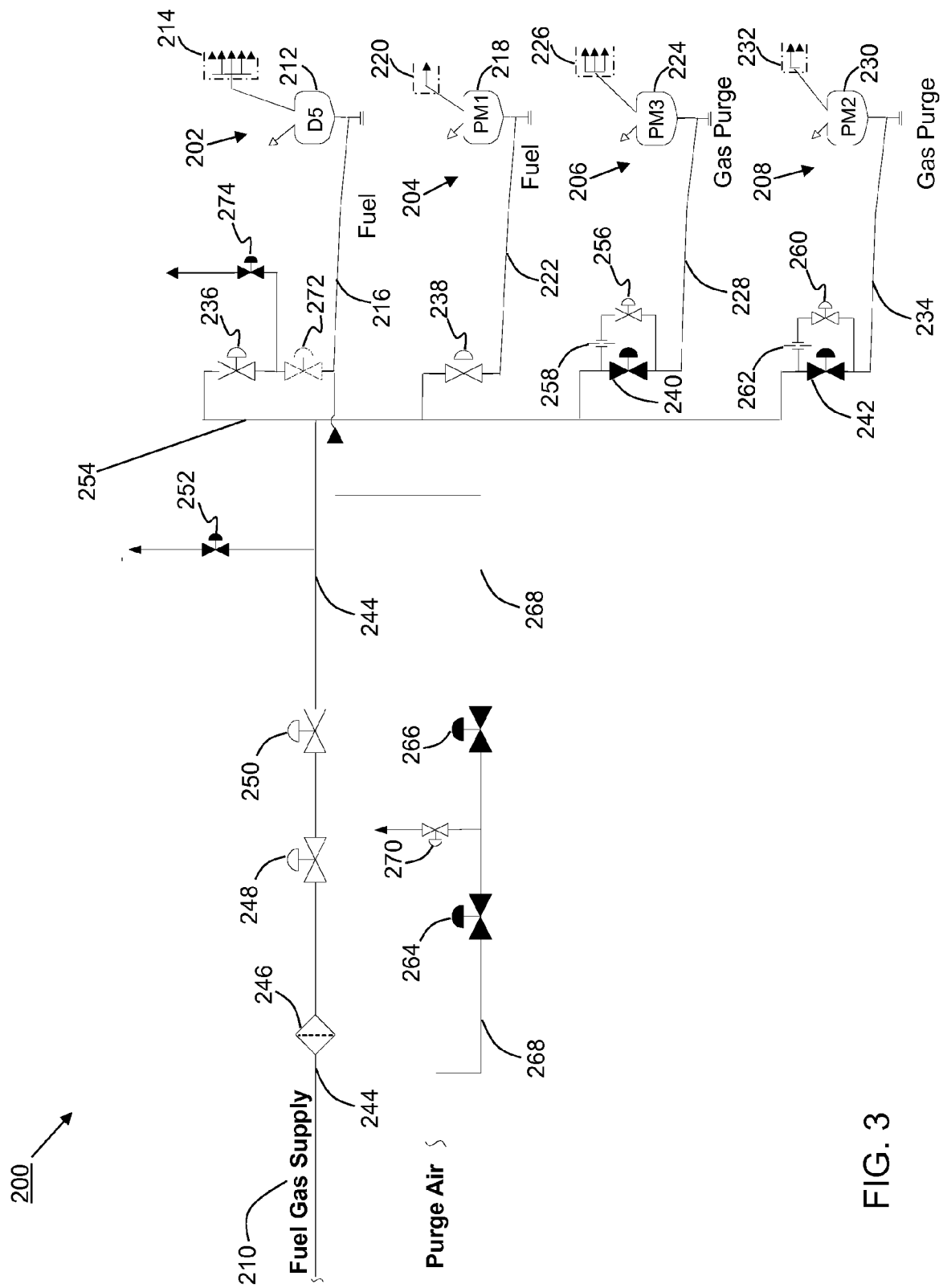
FIG. 3 shows the fuel purge system of FIG. 2 operating in a second combustion mode that can be implemented in the illustration depicted in FIG. 1 according to one embodiment of the present invention.

Referring now to FIG. 3, fuel purge system 200 is shown operating during a partial premix operation with diffusion. In this example, fuel gas circuits 202 and 204 are fueled, while fuel gas circuits 206 and 208 are dormant. As a result, fuel nozzles 214 and 220 can receive fuel gas from fuel gas supply 210. Fuel nozzles 214 and 220 can receive fuel gas because each of their respective gas control valves (i.e., 236 and 238) are open (non-shaded valves indicate valves are in an open position), thereby permitting the flow of fuel gas from distribution header 254 to D5 manifold 212 and PM1 manifold 218, and their respective nozzles. In addition to having gas control valve 236 open, isolation valve 272 is also open (non-shaded valve indicates valve is in an open position), while vent valve 274 is closed (non-shaded valve indicate valve is open position) in order to supply fuel gas to fuel gas circuit 202.

While fuel gas circuits 202 and 204 are being fueled, fuel gas circuits 206 and 208 can be purged because they are dormant. To purge fuel gas circuits 206 and 208, their respective gas control valves 240 and 242 are closed (shaded valves indicate valves are in a closed position). In addition, bypass valve 256 and bypass valve 260 are open (non-shaded valves indicate valves are in an open position). Also, in this example, purge air from the compressor is not supplied along air purge line 268. Thus, isolation valves 264 and 266 are closed (shaded valves indicate valves are in a closed position), and vent valve 270 is open (non-shaded valve indicates a valve in an open position). In this manner, fuel gas circuits 206 and 208 are purged with a predetermined amount of fuel gas, while fuel gas circuits 202 and 204 are fueled. Purging fuel gas circuits 206 and 208 with fuel gas maintains a positive pressure, which prevents backflow. In addition, purging fuel gas circuits 206 and 208 in this manner prevents overheating at fuel nozzles 226 and 232.

Figure 4:
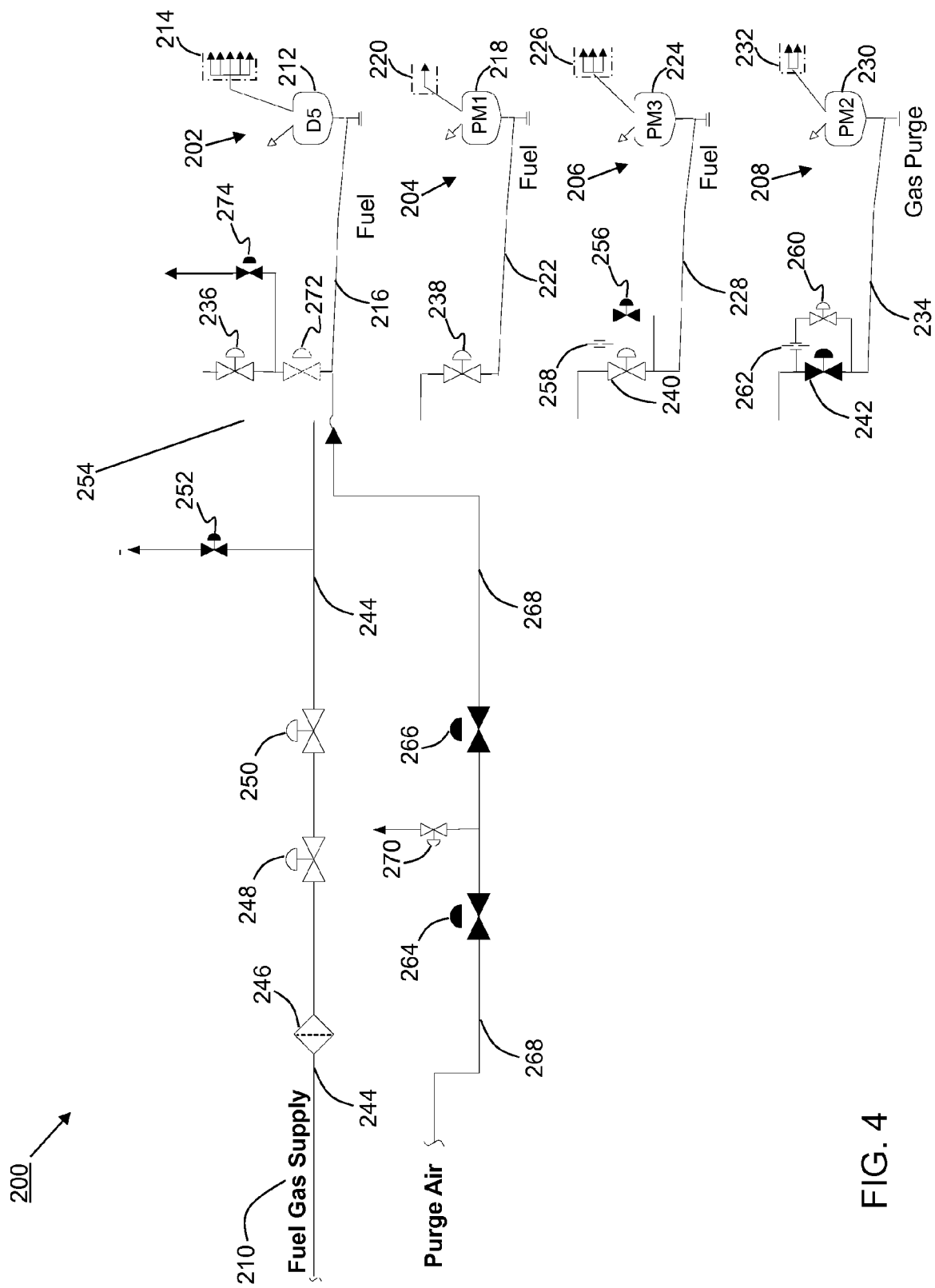
FIG. 4 shows the fuel purge system of FIG. 2 operating in a third combustion mode that can be implemented in the illustration depicted in FIG. 1 according to one embodiment of the present invention.

Referring now to FIG. 4, fuel purge system 200 is shown operating during another example of a partial premix operation with diffusion. In this example, fuel gas circuits 202, 204 and 206 are fueled, while fuel gas circuit 208 is dormant. As a result, fuel nozzles 214, 220 and 226 can receive fuel gas from fuel gas supply 210. Fuel nozzles 214, 220 and 226 can receive fuel gas because each of their respective gas control valves (i.e., 236, 238 and 240) are open (non-shaded valves indicate valves are in an open position), thereby permitting the flow of fuel gas from distribution header 254 to D5 manifold 212, PM1 manifold 218, and PM3 manifold 206, and their respective nozzles. In addition to having gas control valve 236 open, isolation valve 272 is also open (non-shaded valve indicates valve is in an open position), and vent valve 274 is closed (shaded valve indicates valve is in closed position) for fuel gas circuit 202. Also, to deliver fuel to fuel gas circuit 206, by-pass valve 256 is closed (shaded valve indicates valve is in a closed position) in addition to having gas control valve 240 open.

While fuel gas circuits 202, 204 and 206 are being fueled, fuel gas circuit 208 can be purged while it is dormant. To purge fuel gas circuit 208, its respective gas control valve 242 is closed (shaded valve indicate valve is in a closed position). In addition, bypass valve 260 is open (non-shaded valve indicate valve is in an open position). Also, in this example, purge air from the compressor is not supplied along air purge line 268. Thus, isolation valves 264 and 266 are closed (shaded valves indicate valves are in a closed position), and vent valve 270 is open (non-shaded valve indicates a valve in an open position). In this manner, fuel gas circuit 208 is purged with a predetermined amount of fuel gas, while fuel gas circuits 202, 204 and 206 are fueled. Purging fuel gas circuit 208 with fuel gas maintains a positive pressure, which prevent backflow. In addition, purging fuel gas circuit 208 in this manner prevents overheating at fuel nozzles 232.

Figure 5:
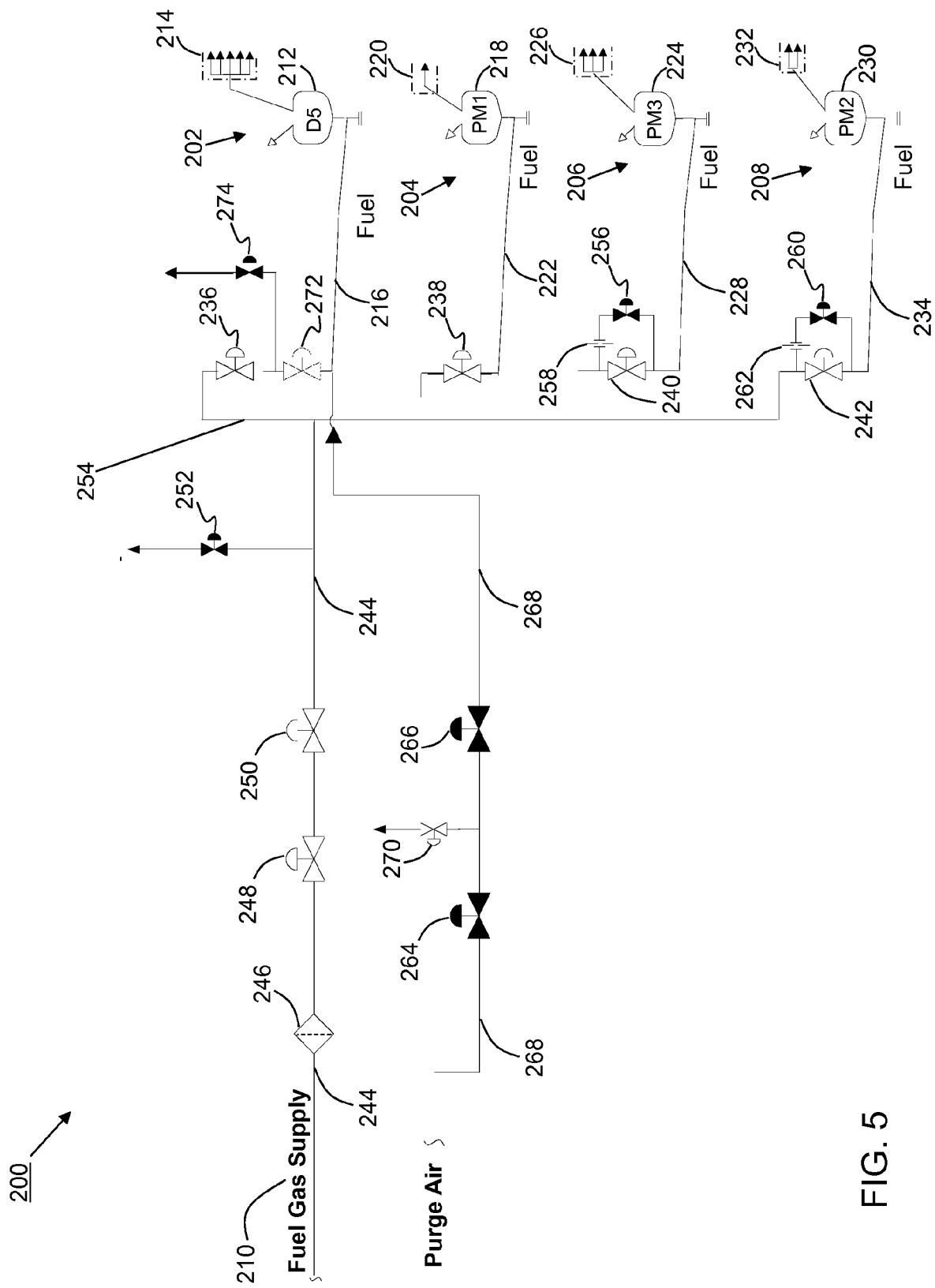
FIG. 5 shows the fuel purge system of FIG. 2 operating in a fourth combustion mode that can be implemented in the illustration depicted in FIG. 1 according to one embodiment of the present invention.

Referring now to FIG. 5, fuel purge system 200 is shown operating during a full premix operation with diffusion. In this example, all fuel gas circuits 202, 204, 206 and 208 are fueled and none are dormant. As a result, fuel nozzles 214, 220, 226 and 232 all can receive fuel gas from fuel gas supply 210. Fuel nozzles 214, 220, 226 and 232 can receive fuel gas because each of their respective gas control valves (i.e., 236, 238, 240 and 242) are open (non-shaded valves indicate valves are in an open position), thereby permitting the flow of fuel gas from distribution header 254 to D5 manifold 212, PM1 manifold 218, PM3 manifold 224 and PM2 manifold 230, and their respective nozzles.

Because fuel gas circuits 206 and 208 are not being purged in this example, by-pass valve 256 and by-pass valve 260 are closed (shaded valves indicate valves are in a closed position). This ensures that fuel gas is supplied to fuel gas circuits 206 and 208 via fuel lines 228 and 234, respectively. Also, in this example, because fuel gas circuit 202 is not purge with purge air, the compressor does not supply any purge air to this circuit. Thus, isolation valves 264 and 266 are closed (shaded valves indicate valves are in a closed position), and vent valve 270 is open (non-shaded valve indicates a valve in an open position) to prevent the flow of purge air into fuel gas circuit 202. In addition, because fuel gas circuit 202 is being fueled, isolation valve 272 is open (non-shaded valve indicates valve is in an open position), and vent valve 274 is closed (non-shaded valve indicate valve is open position) while gas control valve 236 is open.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system, comprising:
a fuel gas supply;
a plurality of fuel gas circuits;
a plurality of gas control valves, each coupled to one of the plurality of fuel gas circuits that control flow of fuel gas thereto from the fuel gas supply; and
a fuel purge system including:
a gas purge valve for controlling an amount of fuel gas delivered to one of the plurality of fuel gas circuits, and
a controller operatively connected to the gas purge valve and operable to selectively purge residual fuel gas from at least one dormant fuel gas circuit of the plurality of fuel gas circuits with fuel gas from the fuel gas supply, wherein the selective purging includes adjusting the gas purge valve to deliver a predetermined amount of fuel gas into the at least one dormant fuel gas circuit.

2. The system according to claim 1, wherein the purge system comprises a by-pass valve coupled about at least one of the plurality of gas control valves, wherein opening the by-pass valve while the at least one of the plurality of gas control valves is in a closed position enables a predetermined amount of fuel gas to flow into the at least one dormant fuel gas circuit.

3. The system according to claim 2, wherein the flow of the predetermined amount of fuel gas into the at least one dormant fuel gas circuit maintains a positive flow of fluid therein.

4. The system according to claim 2, wherein the fuel purge system further comprises a fuel gas orifice that restricts the flow of the fuel gas from the fuel gas supply into the at least one dormant fuel gas circuit.

5. The system according to claim 1, wherein the fuel purge system is further configured to selectively purge fuel gas from the at least one dormant fuel gas circuit with purge air.

6. The system according to claim 5, wherein the fuel purge system comprises an isolation valve located downstream of the at least one of the plurality of gas control valves, and a vent valve coupled between the isolation valve and the at least one of the plurality of gas control valves, wherein the isolation valve and the vent valve prevent fuel gas from mixing with the purge air supplied into a dormant fuel gas circuit.

7. The system according to claim 6, wherein the isolation valve, the at least one of the plurality of gas control valves, and the vent valve collectively form a double-block and bleed valve configuration.

8. A fuel purge system for a combustion turbine engine, comprising:
a fuel gas supply;
a plurality of fuel gas circuits;
a plurality of gas control valves, each coupled to one of the plurality of fuel gas circuits that control flow of fuel gas thereto from the fuel gas supply; and
a purge system including:
a gas purge valve for controlling an amount of fuel gas delivered to one of the plurality of fuel gas circuits, and
a controller operatively connected to the gas purge valve and operable to selectively purge residual fuel gas from at least one dormant fuel gas circuit of the plurality of fuel gas circuits with fuel gas from the fuel gas supply, wherein the selective purging includes adjusting the gas purge valve to deliver a predetermined amount of fuel gas into the at least one dormant fuel gas circuit and to maintain a positive pressure therein.

9. The fuel purge system according to claim 8, wherein the purge system comprises a by-pass valve coupled about at least one of the plurality of gas control valves, wherein opening the by-pass valve while the at least one of the plurality of gas control valves is in a closed position enables the predetermined amount of fuel gas to flow into the at least one dormant fuel gas circuit.

10. The fuel purge system according to claim 9, wherein the purge system further comprises a fuel gas orifice that restricts the flow of the fuel gas from the fuel gas supply into the at least one dormant fuel gas circuit.

11. The fuel purge system according to claim 8, wherein the purge system is further configured to selectively purge the at least one dormant fuel gas circuit with purge air generated from a compressor section of the combustion turbine engine.

12. The fuel purge system according to claim 11, wherein the purge system comprises an isolation valve located downstream of the at least one of the plurality of gas control valves, and a vent valve coupled between the isolation valve and the at least one of the plurality of gas control valves, wherein the isolation valve and the vent valve prevent fuel gas from mixing with the purge air supplied by the compressor section into the at least one dormant fuel gas circuit.

13. The fuel purge system according to claim 12, wherein the isolation valve, the at least one of the plurality of gas control valves, and the vent valve collectively form a double-block and bleed valve configuration.

14. A method for purging a gas turbine engine having a compressor, a combustor that receives compressed air from the compressor and fuel gas from a fuel gas supply for combustion, the fuel gas supply being in fluid communication with a plurality of fuel gas circuits that deliver fuel gas to the combustor that generates hot gases to drive a turbine, the method comprising:
selectively defueling fuel gas circuits from the plurality of fuel gas circuits as the combustor transitions through combustion mode changes, wherein fuel gas circuits change from being active to being dormant in response to being defueled; and
selectively purging residual fuel gas from at least one dormant fuel gas circuit of the plurality of fuel gas circuits with a predetermined amount of fuel gas from the fuel gas supply, wherein the selective purging includes adjusting a gas purge valve to deliver the predetermined amount of fuel gas from the fuel gas supply into the at least one dormant fuel gas circuit and to maintain a positive pressure through the fuel gas circuits, thereby preventing a backflow.

15. The method according to claim 14, further comprising selectively purging the at least one dormant fuel gas circuit with purge air generated from the compressor.

16. The method according to claim 15, further comprising isolating the purge air applied to the fuel gas circuits from mixing with any fuel gas.

17. The method according to claim 15, wherein the gas purge valve is operatively connected between the fuel gas supply and at least one of the plurality of fuel gas circuits.

* * * * *